April 28, 1970 — A. E. SNOWDON — 3,509,392
VARIABLE RELUCTANCE ELECTRIC STEPPING MOTOR WITH FIELD ENERGIZING CIRCUITRY
Filed May 21, 1969
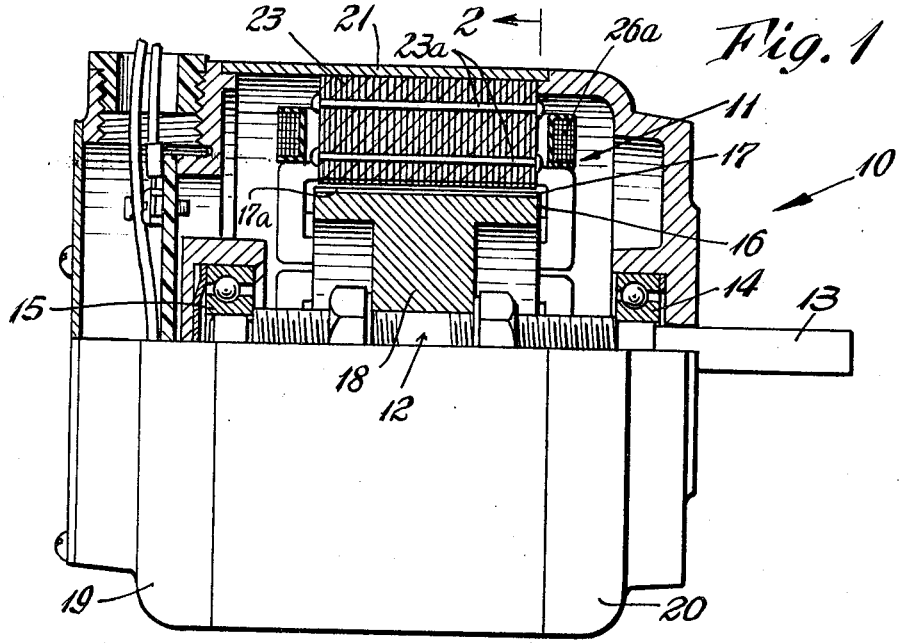
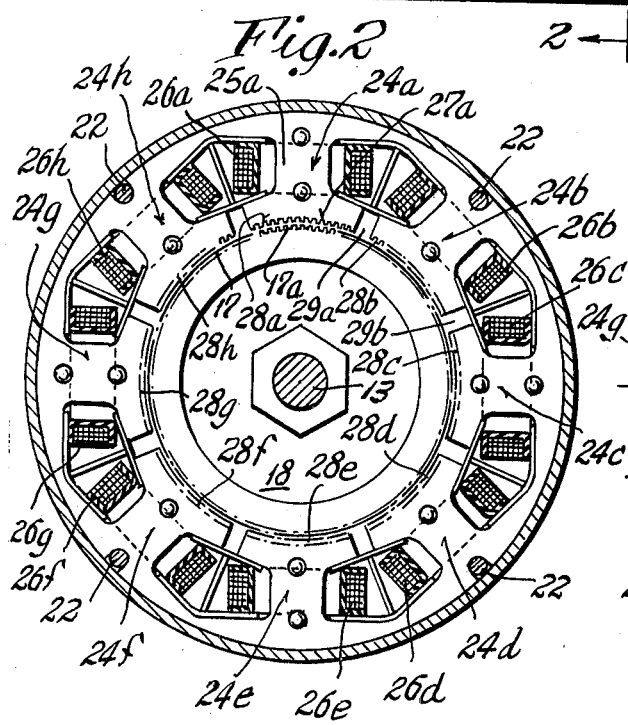
INVENTOR.
Arthur E. Snowdon
BY
Johnson and Klice
ATTORNEYS April 28, 1970                A. E. SNOWDON                3,509,392
         VARIABLE RELUCTANCE ELECTRIC STEPPING MOTOR WITH FIELD
                         ENERGIZING CIRCUITRY
Filed May 21, 1969                                    2 Sheets-Sheet 2

INVENTOR.
Arthur E. Snowdon
BY
Johnson and Kline
ATTORNEYS

United States Patent Office 3,509,392
Patented Apr. 28, 1970

3,509,392
VARIABLE RELUCTANCE ELECTRIC STEPPING MOTOR WITH FIELD ENERGIZING CIRCUITRY
Arthur E. Snowdon, Bristol, Conn., assignor to The Superior Electric Company, Bristol, Conn., a corporation of Connecticut
Filed May 21, 1969, Ser. No. 826,577
Int. Cl. H02k 29/02, 37/00
U.S. Cl. 310—49    6 Claims

ABSTRACT OF THE DISCLOSURE

A stepping motor of the variable reluctance type capable of producing small increments of movement, as for example 1000 steps per revolution, with each change of energization of its windings providing a step and for maintaining the position to which it was last stepped when the energization is unchanged. The motor has a toothed rotor and a plurality of toothed stator poles with the rotor teeth being different from the stator teeth to enable exact alignment to occur between the rotor and stator teeth at only one location at each rotor position. Each change in energization causes the rotor to advance one step to enable exact alignment to occur between the teeth again at only one location but with the location advancing a fraction of a revolution that is the reciprocal of the number of poles. Accordingly, each step or movement of the rotor is a fraction of a revolution that is equal to the reciprocal of the number of rotor teeth times the number of stator poles.

---

In my copending application Ser. No. 790,326 assigned to the assignee of the present invention, there is disclosed a stepping motor which provides a small increment of movement for each change of energization of its windings. The rotor includes a pair of end caps with the periphery of each being cylindrical and axially toothed for coaction with teeth formed on the peripheries of a plurality of stator poles. The pole peripheries are arcuate, having a common center, but as the poles are distinct, there is a gap formed between adjacent poles. For ease in explanation of the operation of the motor, theoretical stator teeth may be assumed to be positioned within the gaps. Each stator pole has a winding which, when energized, causes its associated pole to have one magnetic polarity or the other. The rotor will move to a position of least magnetic reluctance where one of its teeth will be capable of being exactly aligned with a theoretical stator tooth that would be located between two adjacent poles. Each change of energization changes the magnetism of one or more poles to effect movement of the rotor to a new position of least reluctance. The extent of the movement or step is predetermined by the number of rotor teeth and the number of stator poles and at the new position, a different rotor tooth will be capable of being exactly aligned with a different theoretical stator tooth that would be located in the next gap in the direction which the stator field revolves. It will again be the only position where a rotor tooth is capable of being exactly aligned with either an actual or theoretical stator tooth.

The two end caps of the rotor are caused to have a unidirectional magnetic flux therein, which in the specific embodiment described in said application, is effected by a permanent magnet that is secured on the rotor shaft. The magnet is magnetized axially and is positioned between the two end caps so that one end cap is of one magnetic polarity while the other end cap is of the opposite polarity. The magnet increases the torque of the motor but yet it adds weight to the rotor so that it increases the rotor's inertia and this tends to decrease the maximum starting and running stepping speed of the motor.

It is accordingly an object of the present invention to provide a stepping motor having a large number of steps per revolution which is capable of stepping at a relatively high stepping rate as compared to heretofore known motors.

Another object of the present invention is to provide a stepping motor which even though capable of stepping at a high rate produces steps of essentially the same precise length and which produces a step for each change of energization so that the number of steps, corresponds exactly to the number of changes of energization.

A further object of the present invention is to achieve the above objects with a stepping motor that is simple in construction, relatively economical to manufacture, durable in use and which has many components similar to presently produced lower resolution motors.

In carrying out the present invention, the motor herein specifically described has a stator which is essentially similar to the stator disclosed in my above-noted copending application in that it is formed to have a plurality of inwardly extending, equally spaced poles. The peripheries of the poles lie on a circle and are formed with equally spaced teeth and a winding is associated with each pole which upon energization magnetizes its pole. The motor also includes a rotor having a shaft on which is mounted a toothed member formed of permeable material having a cylindrical periphery that is formed with axially extending teeth. The rotor and stator teeth are coaxial and radially aligned such that a small air gap exists therebetween.

The winding of each stator pole is always energized in the same manner to cause its pole to have the same magnetic polarity throughout all different changes of energization of the motor though some of the poles are of one magnetic polarity while others are of the opposite polarity. In the specific embodiment herein described, the motor has eight poles and for each energization only four of the eight poles are magnetized and they are located on one side of a diametrical center line. Moreover, of the four magnetized poles, adjacent poles will have opposite magnetic polarity. With the poles magnetized, the rotor will assume a position of least reluctance with the flux passing through the air gaps between the stator and rotor teeth and at this position, one of the rotor teeth is exactly aligned with a theoretical stator tooth that lies at the median of the four magnetized poles. The exact alignment may be either a tooth or a valley but will be the only location where alignment will exist as all other teeth will be misaligned with either theoretical or actual teeth.

For effecting a subsequent step, three of the four poles are maintained with the same magnetization while the winding of an end pole is deenergized and a non-magnetized pole adjacent to the other energized end pole becomes magnetized so that again four adjacent poles are magnetized of alternating polarity. The diametrical center line of the resulting magnetization shifts to a theoretical tooth that is arcuately displaced ⅛ (the reciprocal of the number of poles) of a revolution from the previous center line and the adjacent rotor tooth will move to be aligned on this new center line producing a movement or step which is the reciprocal of the number of teeth on the rotor times the number of poles. Each subsequent change of energization will continue to have only four energized poles located on one side of a center line and as the poles that are magnetized change, the diametrical center line will incrementally advance and the rotor will have the same direction of movement as the center line when the stator tooth pitch is greater than the rotor tooth pitch and oppositely for the converse structure.

Other features and advantages will hereinafter appear.

In the drawings:

FIGURE 1 is an elevation, partly in section, of the motor of the present invention.

FIG. 2 is a section taken on the line 2—2 of FIG. 1.

FIG. 3 is a diagrammattic representation of the relative position of certain stator and rotor teeth along diametric lines.

FIG. 4 consists of eight pictorial representations, 4a–4h, showing the magnetic polarity of the poles and the position of the diametric magnetic center line for each possible energization of the specific embodiment of the motor herein disclosed.

FIG. 5 is an electrical schematic diagram of the motor and a circuit for enabling the various changes of energization to be effected.

Referring to the drawings, the motor is generally indicated by the reference numeral 10 and includes a stator 11 and a rotor 12. The rotor has a shaft 13 mounted for rotation in ball bearings 14 and 15 and secured thereon is a unitary toothed member 16 formed of permeable material such as steel bar stock, laminated steel, etc. The toothed member is substantially annular having an outer cylindrical periphery 17 and a hub 18. Teeth 17a are formed on the periphery 17 with the teeth extending axially of the rotor and having a constant tooth pitch. In one example, the rotor teeth 17a had a pitch which provided 125 teeth.

The stator 11 includes a pair of end bells 19 and 20 and an annular cover 21 with these parts being secured together as by screws 22. The end bell 19 supports the bearing 15 while the end bell 20 supports the bearing 14. The stator further includes a pole forming member 23 formed of identically shaped laminations of permeable sheet material that are riveted together as by the rivets 23a to form a unitary stack. The pole forming member is force fitted against the interior of a cover 21 to be maintained in position and to be concentric with the rotor 12.

Referring to FIG. 2, each of the laminations forming the member 23 has the cross-sectional shape shown so as to form a plurality of inwardly extending poles 24a–24h with the peripheral portion of each pole lying on a circle concentric with the axis of the rotor. Referring specifically to the pole 24a, it is formed with an intermediate portion 25a that has a winding 26a wound thereabout and its peripheral portion 27a is formed with a plurality of equally spaced teeth 28a. Each of the other poles 24b–24h is identical thereto, positioned to be evenly spaced about the stator circle and have windings 26b–26h and teeth 28b–28h, respectively. It will be understood that a gap, such as gaps 29a, 29b, etc., exists between adjacent poles to effect separation of the poles and also to enable the windings to be inserted therethrough.

Referring to FIG. 5, the windings 26a through 26h are shown connected to a source of unidirectional or D.C. current 30. One side of the D.C. source is connected to switches 31a–31h and each switch controls energization only of the winding connected thereto. The windings of alternate poles are similarly connected across the source 30 in a manner to have these poles magnetized to have an N polarity with such windings being 26a, 26c, 26e and 26g. The windings of the other poles all are connected to make the poles have an S polarity and these windings are 26b, 26d, 26f and 26h.

In the operation of the motor, only four windings are energized at a time and these are the windings of four adjacent poles so that four adjacent poles are magnetized. Thus, as shown in FIG. 3, for one energization of the motor, switches 31a–31d inclusive are closed causing their associated poles 24a, 24b, 24c and 24d, respectively, to have the magnetic polarity indicated by either the letter N or S. The median of the magnetized poles where their magnetic force may be considered to be concentrated lies along a center line 32 which splits the gap 29b between the poles 24b and 24c. The rotor teeth 17a have a pitch which is slightly different from the pitch of the stator teeth so that there may be formed in the stator circle including the gaps, a number of teeth which varies from the number of rotor teeth by one but the tooth difference must be such that there can be exact alignment between only one rotor tooth and one theoretical stator tooth (or valley) at any position of the rotor. This exact alignment for the rotor teeth 17a will occur when the switches 31a–31d are closed along the line 32 as shown by the tooth 17b which is aligned with a theoretical stator tooth 11a that would exist if the gap 29b were not present. Diametrically opposite this rotor tooth 17b there will be complete misalignment between the rotor teeth and the theoretical stator teeth.

In order for the motor to produce a step, a change of energization of the windings must occur to alter the poles that are magnetized and if the step is in a clockwise direction then the switch 31a is opened and the switch 31e is closed causing the pole 24a to be demagnetized and the pole 24e to be magnetized to have an N polarity as shown by the dotted letter N. This will cause the center line 32 to assume its dotted line position 32′ wherein a tooth 17c of the rotor will align itself on the line 32′ with a theoretical stator tooth 11b opposite thereto. The motor will thus have advanced an increment that is the reciprocal of the number of rotor teeth times the number of poles.

Shown in FIG. 4, are the different energizations which the stator poles may have with the poles being schematically shown. For each energization, only four adjacent poles are magnetized and such magnetism is indicated by the letter N or S at the pole positions. Also for each possible energization, the center line 32 on which alignment of the rotor tooth and theoretical stator tooth will occur is shown. FIG. 4a discloses the magnetization of the poles when the switches 31a–31d are energized. FIG. 4b discloses the magnetization for a clockwise step movement which requires switches 31b–31e to be closed. FIG. 4c discloses the magnetization required for the next clockwise step and it is produced by switches 31c through 31f being closed while FIG. 4d the next step clockwise, results from switches 31d–31g being closed. The other remaining FIGURES 4e–4h result from opening the switch connected to the winding of the pole at one end of the four magnetized poles and closing the switch to the winding of the adjacent pole at the other end of the four magnetized poles. The end winding which is deenergized and the winding of the pole which is energized is set by the desired direction of movement of the rotor.

From the different positions of the center line 32, it will be seen that the line has required eight different changes of energization to have revolved completely once and this is the same number of energizations as there are poles. Moreover, as the line merely represents where exact tooth alignment will occur between the rotor tooth and the theoretical stator tooth, the total effect of the revolution of the line will only produce a rotational movement equal to reciprocal of the number of teeth in the rotor. For one complete rotation of the rotor, there will be required a number of changes of energization which is the product of the number of poles times the number of rotor teeth.

One specific embodiment of the herein described motor has a stator formed with eight equally spaced poles and with teeth formed according to a 124 tooth pitch, while the rotor has 125 teeth. This combination produces one thousand steps per revolution. It will be understood that different combinations of tooth pitches and different number of poles, may be utilized in other motors to produce different numbers of steps per revolution. Each motor, however, must enable each winding to be separately energized and to have rotor and stator teeth pitch and/or disposition which enable only one rotor tooth to be exactly aligned with one theoretical (or actual) stator tooth.

The rotor for each change of energization assumes a position of least reluctance with respect to the flux passing through the air gaps between the rotor and stator teeth. If the energization is maintained, the rotor will be held magnetically braked.

The rotor of the motor of the present invention includes only the shaft 13 and the toothed member 16. The shape of the toothed member is made to provide an annular portion of a length that corresponds with the length of the pole forming member and of a thickness which is capable of permitting the flux to pass therethrough from one pole to an adjacent pole without saturation. Thus, it is normally quite thin and of relatively low weight and inertia. The hub 18 also may be made of a size that is also quite low in weight and inertia and may be made of non-magnetic light weight material such as aluminum if a two piece member is desired with the annular portion being of magnetic permeable material. Thus, the inertia of the rotor is relatively small as compared to the inertia of the rotor in my above-mentioned patent application.

The specific embodiment of the motor herein described has a one tooth pitch difference between the rotor and stator teeth to enable exact alignment to occur at only one location. It will be obvious to those skilled in the art that the stator and rotor teeth may have the same pitch but that the poles or the teeth thereon may be displaced a fraction of a tooth pitch from an adjacent pole to effect the same result. In such a construction, alignment may occur between all of the teeth of the one pole and the opposite rotor teeth instead of just one tooth. Thus, in both instances, at any rotative unenergized position of the rotor, only one (if different pitch) or more (if same pitch) teeth of one pole may be exactly aligned with the rotor teeth opposite thereto.

The word "tooth" includes both the actual protruding portion and the valley portion between protruding portions unless the text indicates otherwise. Moreover, with respect to exact alignment, this may occur either with the valley or the protruding portion but in either event, the word "tooth" is utilized to describe the portions that are aligned. For a specific construction of 125 rotor teeth and 124 stator teeth, the valley portions will be aligned while for a construction of 125 rotor teeth and 126 stator teeth, the protruding portions will be aligned.

It will accordingly be understood that there has been disclosed an electric stepping motor which produces an incremental movement for each change of energization of its stator windings. The motor is capable of not only starting at a relatively high stepping rate but for also running at a high stepping rate without loss of a step for each change of energization because of a rotor that has low weight and inertia. The rotor does not include a permanent magnet and in order to provide for a step, each energization requires the magnetizing of all the poles on one side of a diametric line with adjacent poles having opposite magnetic polarity. As the rotor and stator teeth are selected and disposed so that only one of each can be exactly aligned, the alignment will occur on the median or line of concentration of the fluxes from the poles. As the changes of energization change the poles that are magnetized, the median will move about the poles causing tooth alignment therewith. Thus the number of steps which the rotor may take in a revolution is the product of the number of poles and the number of rotor teeth which, accordingly, results in a motor having a high stepping rate with very small increments of movement.

Variations and modifications may be made within the scope of the invention and portions of the improvements may be used without others.

I claim:

1. A stepping motor of the variable reluctance type comprising a stator and a rotor; said stator being formed to have a plurality of inwardly extending poles with the periphery of the poles having equally spaced teeth; said rotor including a shaft, a toothed member carried by the shaft and having a cylindrical periphery on which a plurality of equally spaced teeth are formed; said rotor teeth and said stator teeth having pitches and being disposed to limit the occurrence of exact alignment therebetween to one or more teeth of just one of the poles and to cause the teeth of all of the other poles to be misaligned with the rotor teeth opposite thereto; and means for magnetizing the poles with only the poles on one side of a diametric line being magnetized at a time.

2. The invention as defined in claim 1 in which the adjacent poles are magnetized of the opposite polarity.

3. The invention as defined in claim 1 in which each pole has a winding and in which each winding is always energized with unidirectional current in the same direction to cause the same magnetic polarity in its pole when it is energized.

4. The invention as defined in claim 3 in which there is a source of unidirectional electric power, in which the windings are connected in parallel thereto and in which there are switch means for controlling the energization of each winding with each switch means being independently operable from the other switch means.

5. The invention as defined in claim 2 in which the magnetized poles have a median line where the magnetization may be considered concentrated and in which the one aligned tooth of the rotor is centered thereon.

6. The invention as defined in claim 5 in which the median line is shifted a fraction of a revolution corresponding to the reciprocal of the number of poles for advancing the rotor, said shifting being effected by de-energizing the winding of an end pole of the magnetized poles and magnetizing the pole adjacent to the other end pole of the magnetized poles.

References Cited

UNITED STATES PATENTS

| | | | |
|---|---|---|---|
| Re. 25,445 | 9/1963 | Fredrickson | 310—163 |
| 2,424,843 | 7/1947 | Owsley | 318—20 |
| 3,077,555 | 2/1963 | Fredrickson | 318—254 |
| 3,148,319 | 9/1964 | Fredrickson | 318—166 |
| 3,343,014 | 9/1967 | Giles | 310—49 |
| 3,430,083 | 2/1969 | O'Regan | 310—49 |

WARREN E. RAY, Primary Examiner

U.S. Cl. X.R.

318—138